United States Patent
Phan et al.

(10) Patent No.: US 8,316,176 B1
(45) Date of Patent: Nov. 20, 2012

(54) NON-VOLATILE SEMICONDUCTOR MEMORY SEGREGATING SEQUENTIAL DATA DURING GARBAGE COLLECTION TO REDUCE WRITE AMPLIFICATION

(75) Inventors: Lan D. Phan, Laguna Hills, CA (US); Dominic S. Suryabudi, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 305 days.

(21) Appl. No.: 12/707,552

(22) Filed: Feb. 17, 2010

(51) Int. Cl.
*G06F 12/00* (2006.01)
(52) U.S. Cl. ................................ 711/103; 365/185.33
(58) Field of Classification Search ............... 711/103; 365/185.33
See application file for complete search history.

(56) References Cited

U.S. PATENT DOCUMENTS

| | | | |
|---|---|---|---|
| 7,509,471 B2 | 3/2009 | Gorobets | |
| 2008/0082736 A1 | 4/2008 | Chow et al. | |
| 2008/0256287 A1 | 10/2008 | Lee et al. | |
| 2008/0263305 A1 | 10/2008 | Shu et al. | |
| 2008/0307156 A1 | 12/2008 | Sinclair | |
| 2008/0307164 A1 | 12/2008 | Sinclair | |
| 2009/0012976 A1 | 1/2009 | Kang et al. | |
| 2009/0019218 A1 | 1/2009 | Sinclair et al. | |
| 2009/0119353 A1 | 5/2009 | Oh et al. | |
| 2009/0150599 A1* | 6/2009 | Bennett | 711/103 |
| 2009/0271562 A1* | 10/2009 | Sinclair | 711/103 |
| 2010/0169588 A1* | 7/2010 | Sinclair | 711/160 |
| 2011/0138100 A1* | 6/2011 | Sinclair | 711/5 |
| 2011/0161563 A1* | 6/2011 | Chang et al. | 711/103 |

* cited by examiner

*Primary Examiner* — Hashem Farrokh

(57) ABSTRACT

A non-volatile semiconductor memory is disclosed comprising a memory device including a memory array having a plurality of blocks, each block comprising a plurality of memory segments. A plurality of logical block address (LBA) ranges are defined each identifying a plurality of LBA addresses, wherein at least one block is assigned to each LBA range. A plurality of write commands are received from a host, wherein each write command identifies at least one LBA. Data is written for each write command to the memory device. During a garbage collection operation, a memory segment storing valid write data is identified to be relocated, and the valid write data is relocated to a memory segment in a block of the corresponding LBA range.

22 Claims, 8 Drawing Sheets

NON-VOLATILE SEMICONDUCTOR MEMORY SEGREGATING SEQUENTIAL DATA DURING GARBAGE COLLECTION TO REDUCE WRITE AMPLIFICATION

BACKGROUND

A non-volatile semiconductor memory may be employed as mass storage for a computer system (e.g., desktop, laptop, portable, etc.) or a consumer device (e.g., music player, cell phone, camera, etc.) or other suitable application. The non-volatile semiconductor memory may comprise one or more memory devices (such as a flash memory) and control circuitry for accessing each memory device. Each memory device is coupled to an I/O bus, as well as a number of interface control lines. When issuing a program command or an erase command to a memory device, the control circuitry transfers the address and command data (and write data for a program operation) over the I/O bus. When issuing a read command, the control circuitry transfers the address and command data over the I/O bus and then receives the read data over the I/O bus.

Each memory device typically comprises a number of blocks which are accessed a page at a time. For example, a single block may comprise 128 pages where each page comprises 4 k bytes. Since a page typically cannot be overwritten without first being erased, a new page in a different block is typically selected to perform an "overwrite" operation. To facilitate relocating data to a different page, the non-volatile semiconductor memory implements indirect accessing wherein a logical block address (LBA) representing a data block is mapped to a physical block address (PBA) representing one of the pages. In this manner, when the page for a data block is moved, the LBA is simply reassigned to the new PBA.

Periodically the non-volatile semiconductor memory will perform a garbage collection operation wherein the remaining valid pages of a first block are relocated to a second block so that the first block can be erased (thereby erasing the invalid pages that were previously relocated during overwrite operations). It is desirable to minimize the number of valid pages relocated during garbage collection in order to decrease write amplification and power consumption, as well as increase endurance and performance.

DETAILED DESCRIPTION OF EMBODIMENTS OF THE INVENTION

Figure 1:
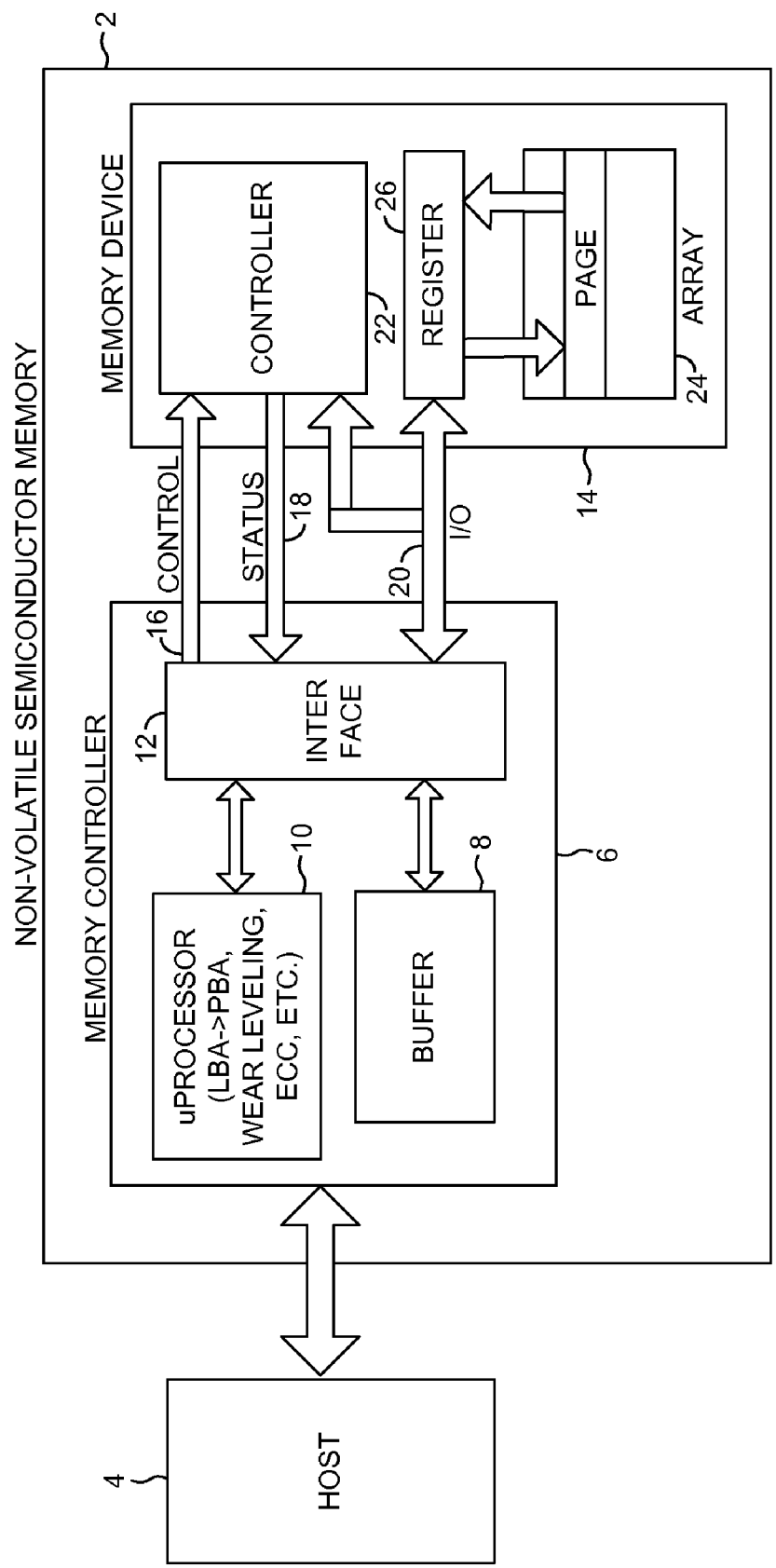
FIG. 1 shows a non-volatile semiconductor memory according to an embodiment of the present invention comprising a memory device including a memory array having a plurality of blocks, and control circuitry.

FIG. 1 shows a non-volatile semiconductor memory 2 communicating with a host 4 according to an embodiment of the present invention. Control circuitry 6 comprises a buffer 8 for buffering data for write/read commands, and a microprocessor 10 executing control programs for various algorithms, such as a logical block address (LBA) to physical block address (PBA) mapping, wear leveling, error correction code, etc. The control circuitry 6 further comprises interface circuitry 12 for interfacing with one or more memory devices 14, such as a suitable flash memory device. The interface circuitry 12 generates suitable control signals 16 and receives status information 18 from the memory device 14 in connection with executing write/read commands initiated by the microprocessor 10. The interface circuitry 12 also transmits and receives data over an I/O bus 20, including read/write data stored in the buffer 8 or command data generated by the microprocessor 10 and transmitted to a controller 22 integrated with the memory device 14.

The memory device 14 comprises a memory array 24 including a plurality of bocks each comprising a plurality of memory segments referred to as pages. During a write operation, write data received over the I/O bus 20 from the buffer 8 is first stored in a data register 26. The controller 22 then transfers the write data from the data register 26 to a target page in the memory array 24. During a read operation, a page in the memory array 24 is read into the data register 26 and then transferred over the I/O bus 20 where it is stored in the buffer 8.

In an embodiment of the present invention, the blocks in the memory array 24 are managed as a pool of available blocks. When a write command is received from the host, a new write block is allocated from the pool of available blocks for storing the write data. When the current write block is full of write data, a new write block is allocated from the pool of available blocks. As new write commands overwrite the same LBAs as previous write commands, the write data stored in an old write block becomes invalid. During a garbage collection operation, the valid memory segments of an old write block are relocated so that the old write block may be erased and re-inserted back into the pool of available blocks. As explained in greater detail below, the valid memory segments of an old write block are relocated to an open block of an LBA range corresponding to the LBA of the memory segment being relocated.

Figure 2A:
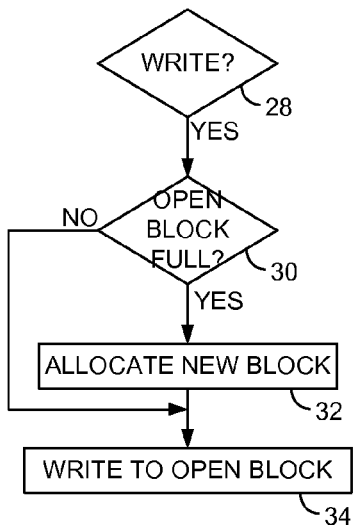
FIG. 2A is a flow diagram executed by the control circuitry according to an embodiment of the present invention wherein write commands received from a host are stored in an open write block.

FIG. 2A is a flow diagram executed by the control circuitry 6 according to an embodiment of the present invention, wherein when a write command is received from a host (step 28), the current write block (open block) is evaluated to determine whether it is full. If so, a new write block is allocated (step 32) from the pool of available blocks, wherein the new write block becomes the open block. The write data is then written to the open write block (step 34).

Figure 2B:
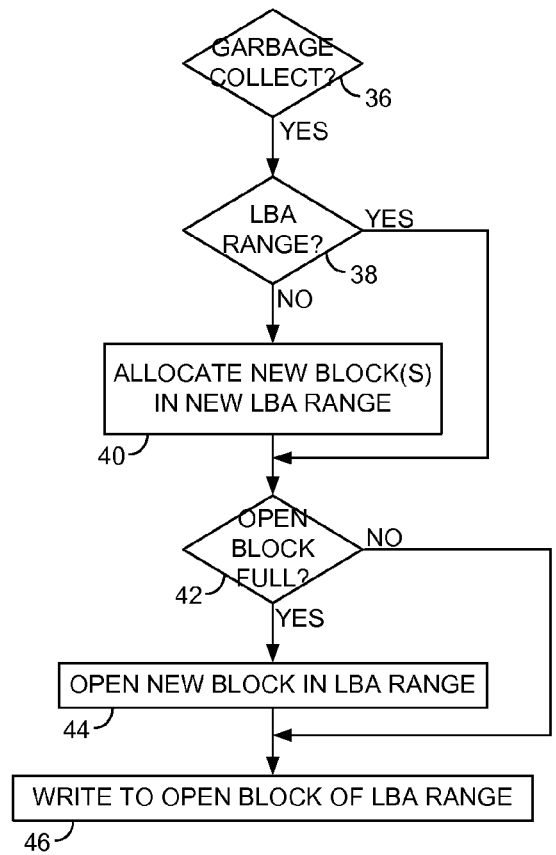
FIG. 2B is a flow diagram executed by the control circuitry according to an embodiment of the present invention wherein during a garbage collection operation valid write data in a write block is relocated to a memory segment in a block of the corresponding LBA range.

FIG. 2B illustrates an embodiment of the present invention wherein during a garbage collection operation (step 36), the LBA address of a memory segment being relocated is evaluated to determine whether it falls within one of a pre-defined LBA ranges (step 38). If not, a new LBA range is defined corresponding to the LBA of the memory segment being relocated, and one or more blocks are allocated to the new LBA range (step 40). The open block of the target LBA range (corresponding to the LBA of the memory segment being relocated) is evaluated to determine whether it is full (step 42). If so, a new block for the LBA range is opened (step 44). The write data in the memory segment is then written to the open block of the LBA range (step 46) and the LBA to PBA mapping table updated to reflect that the memory segment has been relocated.

Segregating the write data based on LBA helps reduce write amplification since it reduces the number of valid memory segments that need to be relocated during garbage collection. This benefit may be more pronounced when the write data of sequential writes are segregated into LBA ranges. Sequential writes typically occur when the host periodically overwrites the same part of a file. For example, certain operating system files may be periodically overwritten by the host, or certain support files of user applications may be periodically overwritten, or user data files (e.g., database files) may be periodically overwritten. Segregating the write data into corresponding LBA ranges increases the chances that an entire block of memory segments will be overwritten. When this happens, the block can be erased without relocating any of the memory segments, thereby reducing write amplification of the non-volatile memory array (write amplification reduces the life of the memory array due to the limited number of erase/program cycles that may be performed on each block).

Figure 3:
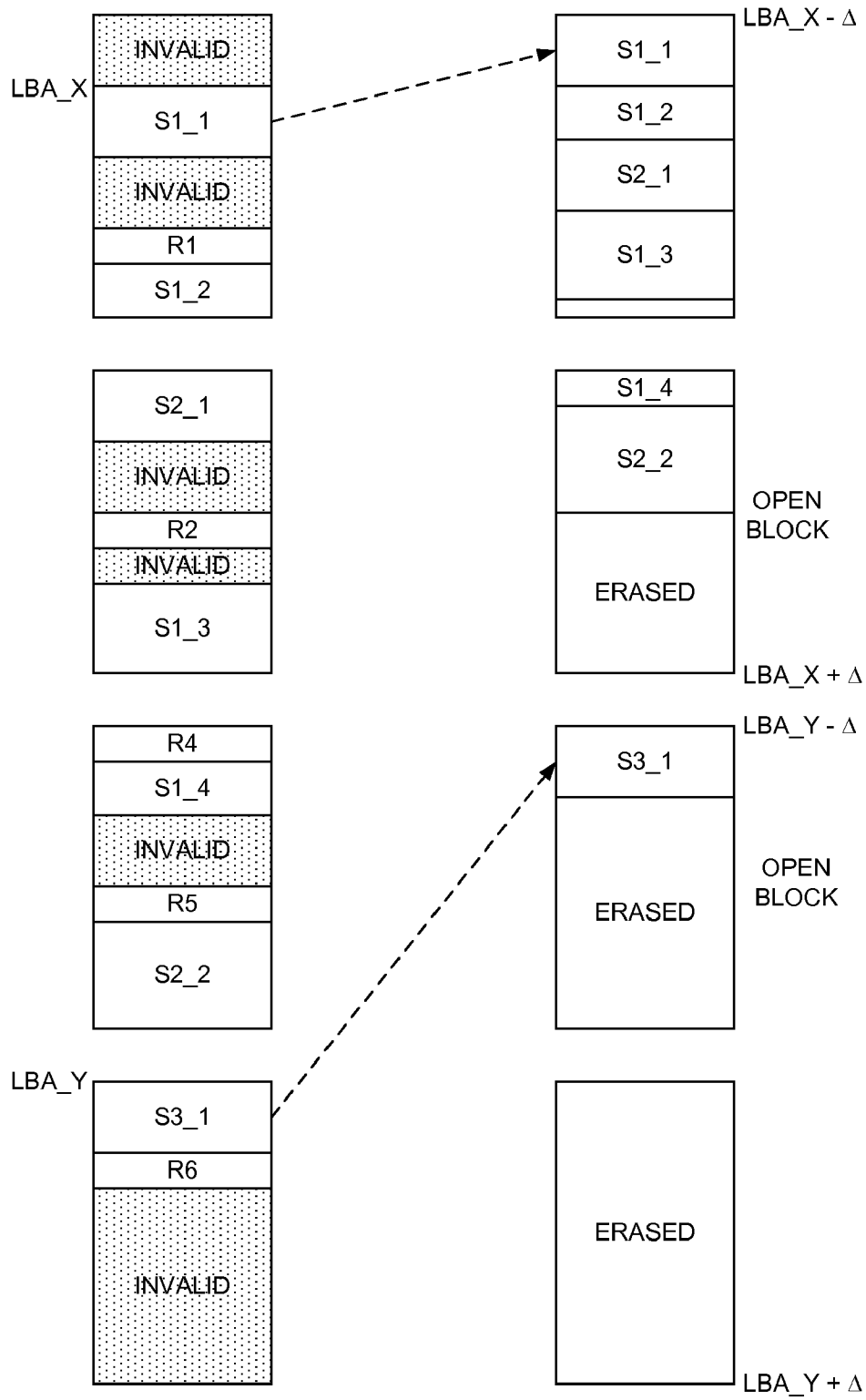
FIG. 3 illustrates an embodiment of the present invention wherein write data for first and second sequential writes are garbage collected into a first LBA range, and write data for a third sequential write is garbage collected into a second LBA range.

FIG. 3 illustrates an embodiment of the present invention wherein the left column of blocks represents old write blocks comprising memory segments that have been overwritten (invalid) as well as valid memory segments not yet overwritten. When the garbage collection operation is performed on these blocks, the LBAs of the valid memory segments are evaluated so they can be relocated to the open block of the corresponding LBA range shown on the right column. The valid memory segments in the old write blocks comprise write data of sequential writes (S commands) as well as random writes (R commands). The sequential writes may be interleaved as shown in FIG. 3 due to the host accessing different files at different times.

Referring to the first write block in the left column, when the memory segments corresponding to S1_1 are to be relocated, an LBA range corresponding to LBA_X is created, and a number of blocks allocated to the range. In the example of FIG. 3, two blocks are allocated to the new LBA range, although as few as one or more than two blocks may be allocated. The blocks of an LBA range are not ordered in any particular manner, that is, the blocks do not necessarily represent a consecutive sequence of LBAs, only that the memory segments within the blocks are assigned an LBA that falls within the LBA range. In one embodiment, new blocks are allocated to the LBA range as needed (e.g., after the initially allocated blocks are filled with relocated write data), and in one embodiment, the number of memory segments (in blocks) allocated to an LBA range may actually exceed the number of LBAs in the range due to certain of the memory segments becoming invalid after the corresponding LBAs are overwritten.

In the embodiment of FIG. 3, the LBA range is defined by subtracting and adding a delta from LBA_X. For example, if LBA_X equals 10000, the LBA range may span LBA 9000 to LBA 11000 (i.e., delta equal to 1000). In the example of FIG. 3, the memory segments corresponding to sequential writes S1 and S2 are relocated from the old write blocks to LBA range LBA_X±Δ, whereas the memory segments corresponding to sequential writes S3 are relocated to LBA range LBA_Y±Δ. The memory segments corresponding to random writes (Rn) are relocated to a corresponding pool of blocks (not shown) allocated for random write commands. Any suitable technique may be employed to distinguish between sequential and random writes, and in one embodiment, the number of consecutive LBAs is the distinguishing feature. For example, if the number of consecutive LBAs is less than or equal to a threshold (e.g., threshold of one), then the write may be considered random, otherwise it may be considered part of sequential write operation.

Figure 4:
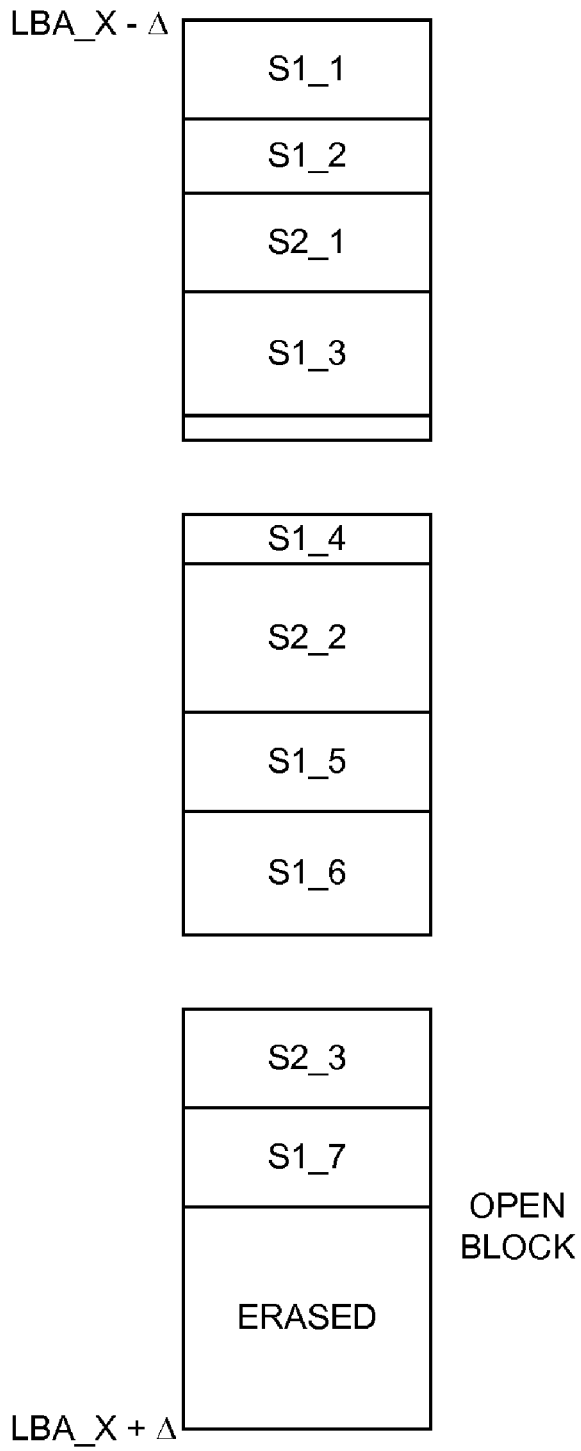
FIG. 4 illustrates an embodiment of the present invention wherein when a current block of an LBA range fills up, a new block from a pool of available blocks is allocated to the LBA range.

FIG. 4 illustrates an embodiment of the present invention wherein when the open block of an LBA range becomes full, a new block is allocated to the LBA range from the pool of available blocks. The new block of the LBA range becomes the open block for receiving relocated memory segments during the garbage collection operation.

Figure 5:
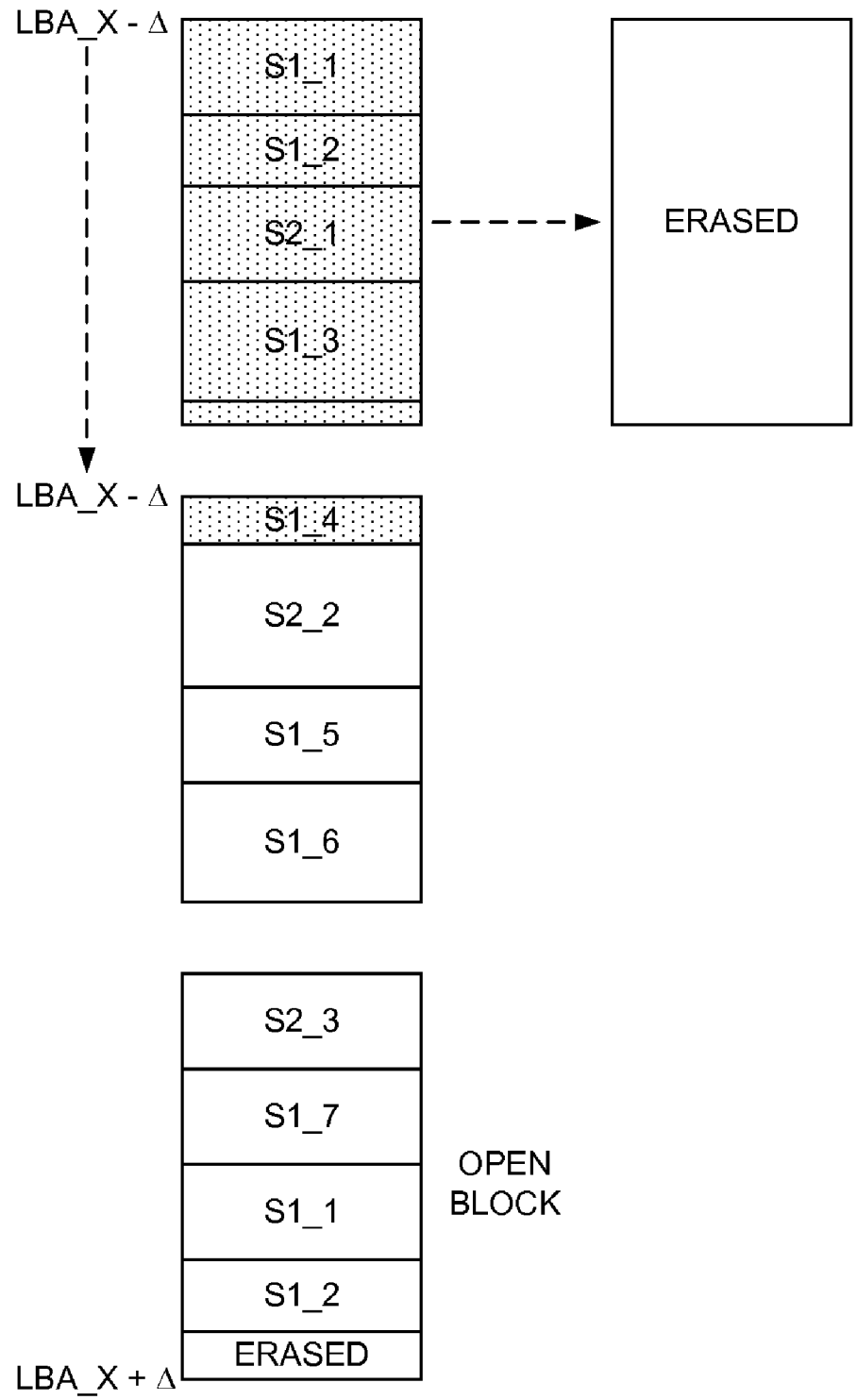
FIG. 5 illustrates an embodiment of the present invention wherein an entire block in an LBA range may be erased without having to relocate valid write data.

FIG. 5 illustrates an embodiment of the present invention wherein the LBAs of an old block in an LBA range are completely overwritten by subsequent write commands received from the host, and therefore all of the memory segments within the old block become invalid. Since all of the memory segments are invalid, the block can be erased during the garbage collection operation without relocating any valid memory segments, thereby reducing write amplification. In one embodiment, the erased block is re-inserted into the pool of available blocks rather than remain allocated to the LBA range. In this manner, a wear leveling algorithm may be executed on the pool of available blocks so that the blocks are allocated to the LBA ranges in a manner that distributes program/erase cycles evenly over all the blocks.

Figure 6:
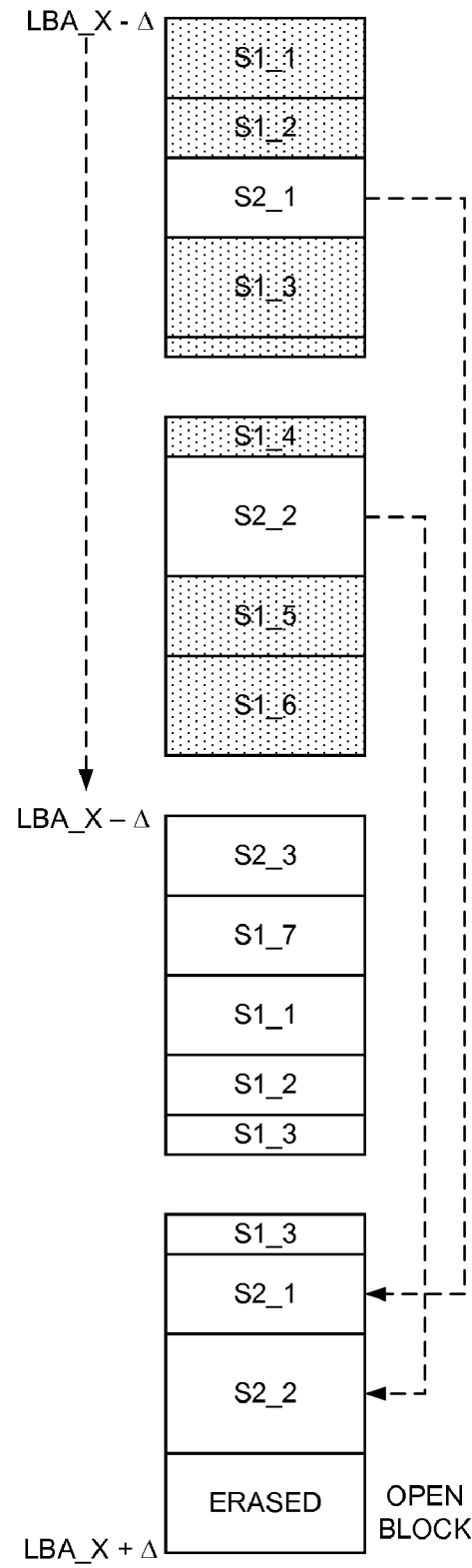
FIG. 6 illustrates an embodiment of the present invention wherein valid write data stored in a first block of an LBA range may be relocated to a second, open block of the LBA range during a garbage collection operation.

FIG. 6 shows an embodiment of the present invention wherein old blocks of an LBA range may comprise invalid memory segments (due to the corresponding LBAs being overwritten) as well as valid memory segments storing write data that has not been overwritten. In the example of FIG. 6, a first sequence of sequential writes S1 is overwritten by the host (e.g., by overwriting all or part of a file), whereas a second sequence of sequential writes S2 has not been overwritten. During a garbage collection operation, the valid memory segments of an old block are relocated to the open block of the same LBA range. The old blocks are then erased and re-inserted into the available pool of blocks. As the valid memory segments of sequential writes are relocated within the same LBA range, the memory segments of sequential writes may eventually segregate within the LBA range rather than interleave with one another, which may help reduce write amplification.

Figure 7:
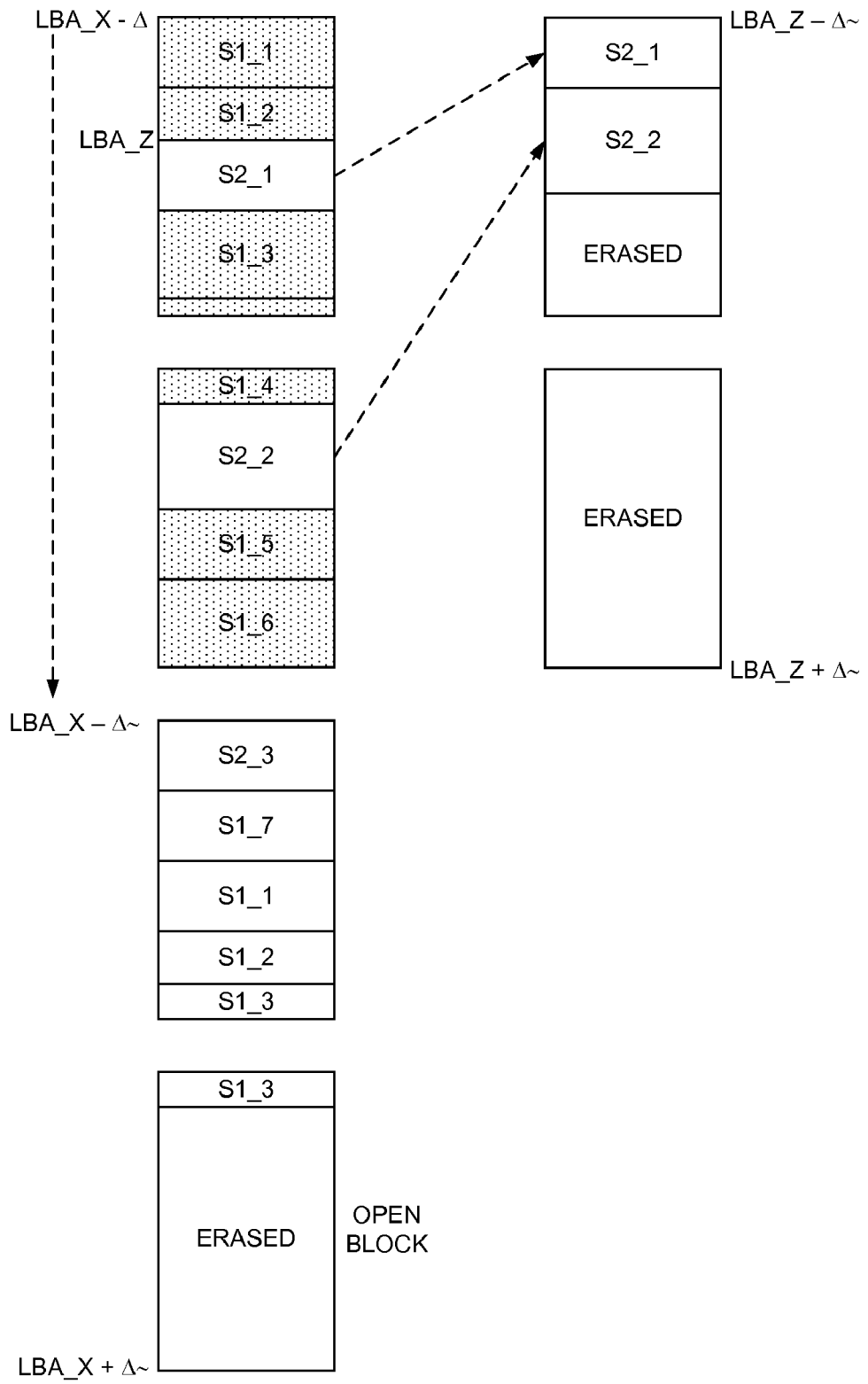
FIG. 7 illustrates an embodiment of the present invention wherein a current LBA range may be split into two LBA ranges in order to segregate sequential writes into separate LBA ranges.

FIG. 7 illustrates an embodiment of the present invention wherein when performing a garbage collection operation on old blocks of an LBA range, the valid memory segments are relocated to a newly created LBA range. That is, the old LBA range is divided into two (or more) LBA ranges, and the corresponding LBAs of valid memory segments are relocated to the memory segments of the new LBA range. In the example of FIG. 7, the memory segments of sequential writes S2 are relocated to the new LBA range defined by the first LBA encountered in the valid memory segments (LBA_Z). The new LBA range is defined by adding and subtracting a delta from LBA_Z, and the old LBA range adjusted accordingly. For example, if the old LBA range is from 9000 to 11000 (i.e., LBA_X=10000), and LBA_Z equals 9500, the new LBA range (for LBA_Z) may be set to 9000 to 9999, and the old LBA range (for LBA_X) adjusted to cover LBAs 10000 to 11000. In this manner, the valid memory segments of sequential writes (e.g., sequential writes S2) may be segregated and assigned to a separate LBA range. Eventually each of the sequential writes may be segregated into their own LBA range so that interleaving of sequential writes within the same LBA range does not occur. This segregating of sequential writes may further reduce write amplification by reducing the number of valid memory segments that are relocated during garbage collection.

Figure 8:
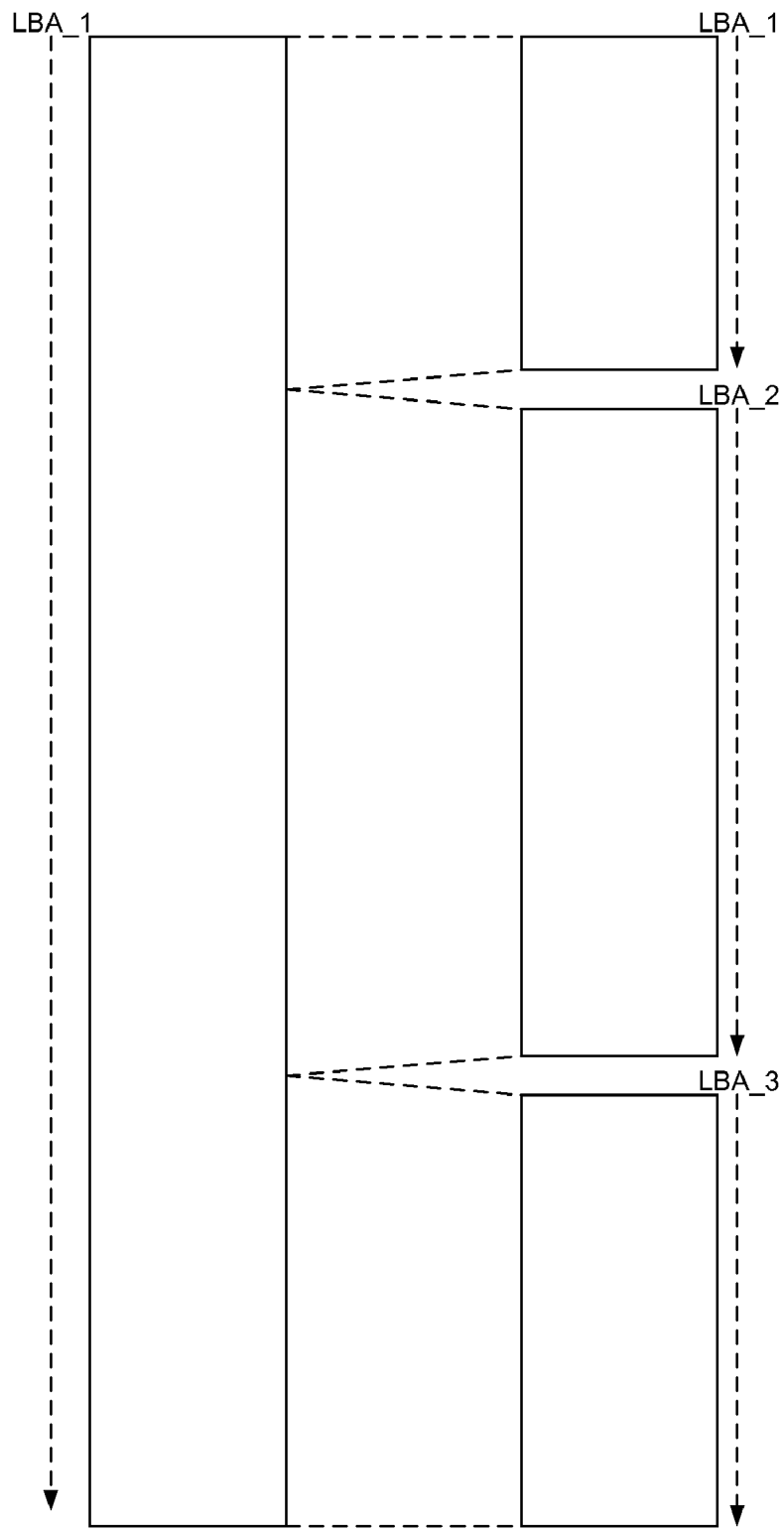
FIG. 8 illustrates an embodiment of the present invention wherein a current LBA range may be split into three LBA ranges in order to segregate sequential writes into separate LBA ranges.

In the example of FIG. 7, the LBA_X range is divided into two ranges (LBA_Z and remainder into LBA_X). In an embodiment illustrated in FIG. 8, an LBA range may be divided into three LBA ranges. For example, if an LBA of a valid memory segment being relocated falls in the middle of a current LBA range, the LBA range may be divided into three LBA ranges with the valid memory segment being relocated to the middle LBA range (LBA_2) of FIG. 8.

In the embodiment shown in FIG. 3, during the garbage collection operation the valid memory segments of old blocks in an LBA range are relocated to the corresponding LBA ranges in the order they are encountered in each block. In an alternative embodiment, a plurality of the old blocks may be evaluated and the memory segments relocated in a manner that maintains a sequential order of the LBAs for the current garbage collection operation. Referring to the blocks in the LBA_X range shown in FIG. 3, instead of interleaving the S1 and S2 sequential writes, the S1 and S2 memory segments may be relocated so as to maintain the sequential order of the LBAs for S1 and S2. Although this embodiment may help reduce interleaving of sequential writes within a single garbage collection operation, there may still be interleaving of sequential writes across multiple garbage collection operations.

A garbage collection operation to reclaim old blocks may be performed at any suitable time. In one embodiment, the garbage collection operation may be executed during an idle mode of the memory device (while not servicing host commands). In another embodiment, a garbage collection operation may be "forced" if the number of old blocks exceeds a threshold, or the pool of available blocks shrinks below a threshold. In yet another embodiment, the garbage collection operation may erase old blocks comprising only invalid memory segments and defer the processing of blocks comprising valid and invalid memory segments. In this manner, subsequent write commands may overwrite the LBAs of the valid memory segments so as to reduce or eliminate altogether the need to relocate valid memory segments during subsequent garbage collection operations.

In the embodiment of FIG. 2, LBA ranges are defined as the LBAs of valid memory segments are processed during the garbage collection operation. If a LBA of a valid memory segment does not fall within an existing LBA range, then a new LBA range is defined. In an alternative embodiment, the LBA ranges may be predefined such as by dividing the entire range of LBAs into predetermined segments. As described above, the predefined LBA ranges may then be divided and/or adjusted during the garbage collection operation to better align with the LBA boundaries of sequential writes.

The control circuitry 6 in the non-volatile semiconductor memory (FIG. 1) may comprise any suitable circuitry, such as one or more integrated circuits. In one embodiment, the control circuitry 6 comprises a microprocessor 10 executing code segments of a control program for implementing the above described flow diagrams. Alternatively, or in addition to the microprocessor 10, the control circuitry 6 may comprise state machine circuitry implemented in an application specific integrated circuit.

What is claimed is:

1. A non-volatile semiconductor memory comprising:
a memory device comprising a memory array including a plurality of blocks, each block comprising a plurality of memory segments; and
control circuitry operable to:
define a plurality of logical block address (LBA) ranges each identifying a plurality of LBA addresses, wherein at least one block is assigned to each LBA range;
receive a plurality of write commands from a host, wherein each write command identifies at least one LBA;
write data for each write command to the memory device;
during a garbage collection operation, identify a memory segment storing valid sequential write data to be relocated and valid random write data to be relocated;
relocate the valid sequential write data to a memory segment in a block of the corresponding LBA range; and
relocate the valid random write data to a memory segment in a block unassigned to the LBA ranges.

2. The non-volatile semiconductor memory as recited in claim 1, wherein the control circuitry is operable to define the plurality of LBA ranges during the garbage collection operation in response to the memory segment storing valid sequential write data.

3. The non-volatile semiconductor memory as recited in claim 1, wherein a plurality of sequential LBAs are mapped to the valid sequential write data.

4. The non-volatile semiconductor memory as recited in claim 1, wherein the control circuitry is further operable to write data for a write command to the block storing the relocated valid random write data.

5. The non-volatile semiconductor memory as recited in claim 1, wherein the control circuitry is further operable to define a first LBA range in response to an LBA of a write command received from the host.

6. The non-volatile semiconductor memory as recited in claim 5, wherein the control circuitry is further operable to define the first LBA range by subtracting and adding a delta to the LBA of the write command.

7. The non-volatile semiconductor memory as recited in claim 1, wherein the control circuitry is further operable to allocate a new block in an LBA range when a current open block of the LBA range is full.

8. The non-volatile semiconductor memory as recited in claim 1, wherein the control circuitry is operable to store the valid sequential write data to be relocated in a first block of a first LBA range.

9. The non-volatile semiconductor memory as recited in claim 8, wherein the control circuitry is further operable to relocate the valid sequential write data from the first block to a second block of the first LBA range.

10. The non-volatile semiconductor memory as recited in claim 8, wherein the control circuitry is further operable to:
- define a second LBA range in response to an LBA assigned to the valid sequential write data; and
- relocate the valid sequential write data from the first block of the first LBA range to a second block of the second LBA range.

11. The non-volatile semiconductor memory as recited in claim 10, wherein the control circuitry is further operable to adjust the LBAs identified by the first LBA range in connection with relocating the valid sequential write data from the first block of the first LBA range to the second block of the second LBA range.

12. A method of operating a non-volatile semiconductor memory comprising a memory device comprising a memory array including a plurality of blocks, each block comprising a plurality of memory segments, the method comprising:
- defining a plurality of logical block address (LBA) ranges each identifying a plurality of LBA addresses, wherein at least one block is assigned to each LBA range;
- receiving a plurality of write commands from a host, wherein each write command identifies at least one LBA;
- writing data for each write command to the memory device;
- during a garbage collection operation, identifying a memory segment storing valid sequential write data to be relocated and valid random write data to be relocated;
- relocating the valid sequential write data to a memory segment in a block of the corresponding LBA range; and
- relocating the valid random write data to a memory segment in a block unassigned to the LBA ranges.

13. The method as recited in claim 12, wherein the plurality of LBA ranges are defined during the garbage collection operation in response to the memory segment storing valid sequential write data.

14. The method as recited in claim 12, wherein a plurality of sequential LBAs are mapped to the valid sequential write data.

15. The method as recited in claim 12, further comprising writing data for a write command to the block storing the relocated valid random write data.

16. The method as recited in claim 12, further comprising defining a first LBA range in response to an LBA of a write command received from the host.

17. The method as recited in claim 16, wherein the first LBA range is defined by subtracting and adding a delta to the LBA of the write command.

18. The method as recited in claim 12, further comprising allocating a new block in an LBA range when a current open block of the LBA range is full.

19. The method as recited in claim 12, wherein the valid sequential write data to be relocated is stored in a first block of a first LBA range.

20. The method as recited in claim 19, further comprising relocating the valid sequential write data from the first block to a second block of the first LBA range.

21. The method as recited in claim 19, further comprising:
- defining a second LBA range in response to an LBA assigned to the valid sequential write data; and
- relocating the valid sequential write data from the first block of the first LBA range to a second block of the second LBA range.

22. The method as recited in claim 21, further comprising adjusting the LBAs identified by the first LBA range in connection with relocating the valid sequential write data from the first block of the first LBA range to the second block of the second LBA range.

* * * * *